US006862611B1

United States Patent
Marics et al.

(10) Patent No.: US 6,862,611 B1
(45) Date of Patent: Mar. 1, 2005

(54) SYSTEM AND METHOD FOR PROVIDING INTERNET ADDRESS CORRESPONDING TO AN ELECTRONIC SIGNAL TO A USER

(75) Inventors: Monica A. Marics, Boulder, CO (US); J. Clarke Stevens, Broomfield, CO (US); Patricia Somers, Boulder, CO (US); Anne P. McClard, Lafayette, CO (US)

(73) Assignee: MediaOne Group, Inc., Englewood, CO (US)

( * ) Notice: Subject to any disclaimer, the term of this patent is extended or adjusted under 35 U.S.C. 154(b) by 663 days.

(21) Appl. No.: 09/591,158

(22) Filed: Jun. 9, 2000

(51) Int. Cl.[7] ............................................. G06F 15/16
(52) U.S. Cl. ...................... 709/218; 709/219; 709/224; 725/112; 345/718; 348/478
(58) Field of Search .................... 709/218, 219; 725/81, 110, 112; 345/718

(56) References Cited

U.S. PATENT DOCUMENTS

| 5,761,606 | A | | 6/1998 | Wolzien |
| 5,831,664 | A | | 11/1998 | Wharton et al. |
| 6,018,768 | A | | 1/2000 | Ullman et al. |
| 6,028,600 | A | | 2/2000 | Rosin et al. |
| 6,075,568 | A | * | 6/2000 | Matsuura ................... 348/478 |
| 6,510,461 | B1 | * | 1/2003 | Nielsen ...................... 709/224 |
| 2003/0005463 | A1 | * | 1/2003 | Macrae et al. .............. 725/112 |

FOREIGN PATENT DOCUMENTS

WO  WO 98/17064  4/1998

OTHER PUBLICATIONS

"Bruecke Zwischen Fernsehen, PC, Und Internet"Radio vol. 47, No. 3, Mar. 1998 (1998–03), pp. 21–23 not in English.

* cited by examiner

*Primary Examiner*—Wen-Tai Lin
(74) *Attorney, Agent, or Firm*—Brooks Kushman P.C.

(57) ABSTRACT

A system and method are provided for providing Internet addresses corresponding to an electronic signal, such as a video or audio program, to a user. The system includes a receiver for receiving at least one electronic signal, where the electronic signal includes one or more Internet addresses embedded therein. A decoder in communication with the receiver is operable to extract the one or more Internet addresses from the electronic signal. The system further includes a processor in communication with the decoder. The processor compiles a historical list of the one or more Internet addresses extracted from the electronic signal, and includes memory for storing the historical list. A web browser connected to the processor is operable to present the historical list of Internet addresses to the user.

27 Claims, 2 Drawing Sheets

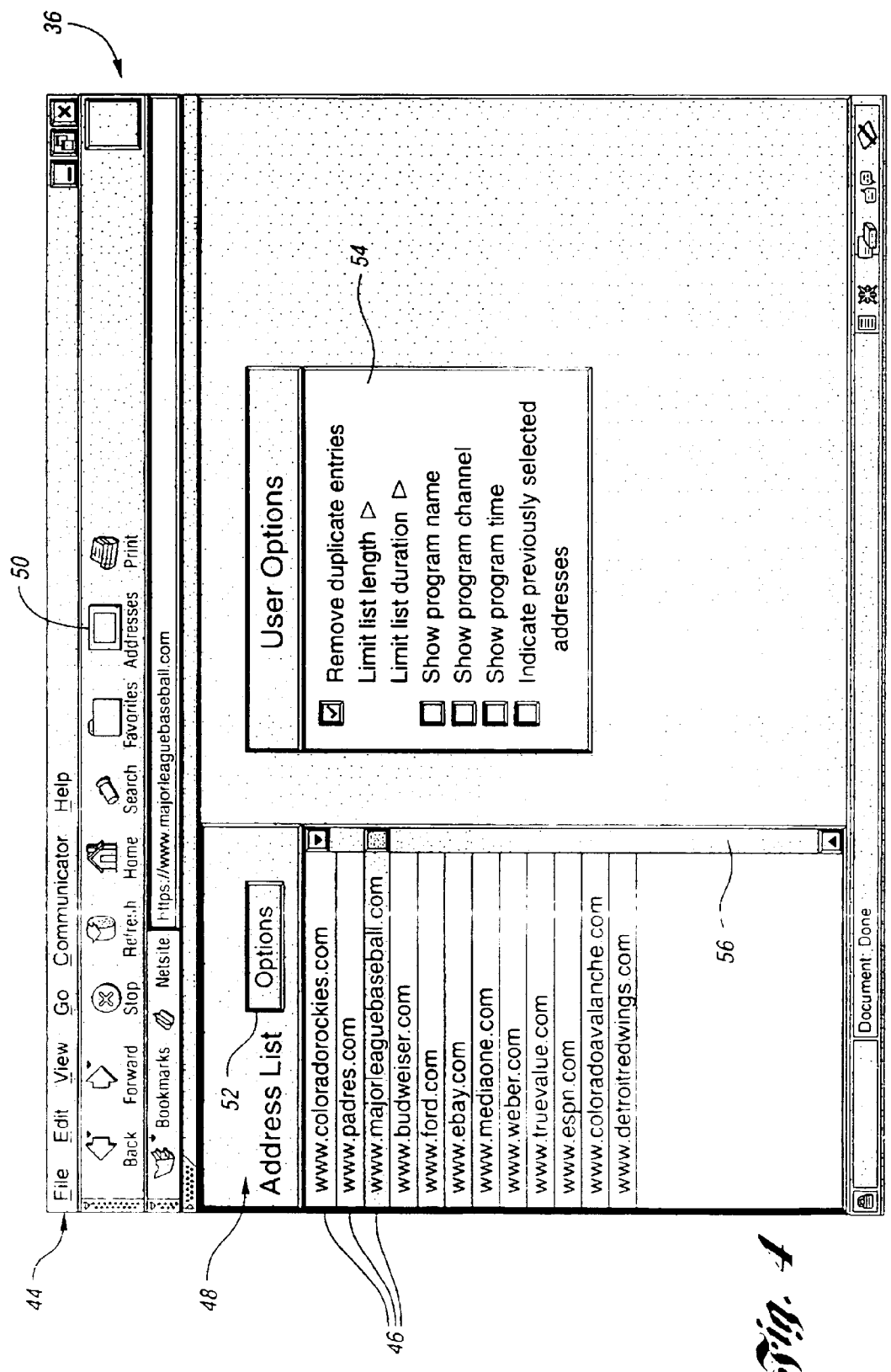

SYSTEM AND METHOD FOR PROVIDING INTERNET ADDRESS CORRESPONDING TO AN ELECTRONIC SIGNAL TO A USER

TECHNICAL FIELD

This invention relates to a system and method for providing Internet addresses corresponding to an electronic signal, such as a video or audio program, to a user.

BACKGROUND ART

Increasingly, people "surf" the Internet and watch television at the same time. Since the Internet contains a vast amount of information on virtually any subject, viewers may wish to search for information related to the topic of the particular programming they are watching. Unfortunately, the Internet is not always well organized, and the search for additional information may be quite time consuming.

In some instances, video programming references a related web site through a text display or voice-over. However, viewers may not remember the Internet address correctly, and fail to ever reach the referenced web site. In addition, there may be a number of sites from which the viewer could obtain additional information related to the subject matter of the video program. Since television programs and commercials are limited in duration, they cannot contain all the related information that a viewer may wish to receive.

Currently, it is known that uniform resource locators (URLs), which designate particular Internet addresses, can be embedded in an electronic signal, such as a video or audio program. A URL decoder is then used to extract the URL from the video signal and determine the associated Internet address. In this way, Internet addresses related to the programming can be inserted by the program creator, thereby narrowing the search for Internet information.

As one example of integration of television and the Internet, U.S. Pat. No. 6,018,768 issued to Ullman et al. discloses synchronizing the broadcast of a video program with the presentation of web pages related to the program. More particularly, URLs embedded in the video program signal are extracted and interpreted, and the associated web pages are retrieved and automatically streamed to the user. In this system, therefore, the user receives all of the web pages prescribed by the broadcaster, in the order prescribed by the broadcaster. However, the user may not wish to view each and every web page designated by the video program, and furthermore may wish to view the web pages at a time and in an order of their choosing.

Therefore, a need exists for an integration of video and/or audio programming and the Internet, wherein the retrieval of web sites related to the programming is selectable by the user.

DISCLOSURE OF INVENTION

It is an object of the present invention to provide a system and method for providing Internet addresses corresponding to an electronic signal to a user wherein the user controls whether or not the associated web pages are displayed.

It is a further object of the present invention to provide a system and method for providing Internet addresses corresponding to an electronic signal to a user wherein the user controls the order in which the associated web pages are displayed.

It is another object of the present invention to provide a system and method for providing Internet addresses corresponding to an electronic signal to a user wherein the user can view a historical list of Internet addresses extracted from the electronic signal.

It is a further object of the present invention to provide a system and method for providing Internet addresses corresponding to an electronic signal to a user wherein the historical list of Internet addresses can include addresses from more than one video or audio program It is a still further object of the present invention to provide a system and method for providing Internet addresses corresponding to an electronic signal to a user wherein the Internet addresses include information indicating the program source.

Accordingly, a system is provided for providing Internet addresses corresponding to an electronic signal, such as a video or audio program, to a user. The system includes a receiver for receiving at least one electronic signal, where the electronic signal includes one or more Internet addresses embedded therein that correspond to the electronic signal. A decoder in communication with the receiver is operable to extract the one or more Internet addresses from the electronic signal. The system further includes a processor in communication with the decoder. The processor compiles a historical list of the one or more Internet addresses extracted from the electronic signal, and includes memory for storing the historical list. A web browser connected to the processor is operable to present the historical list of Internet addresses to the user.

Correspondingly, a method is provided for providing Internet addresses corresponding to an electronic signal to a user. The method includes receiving at least one electronic signal, where the electronic signal includes one or more Internet addresses embedded therein that correspond to the electronic signal The method further includes extracting the one or more Internet addresses from the electronic signal. Still further, the method includes compiling and storing a historical list of the Internet addresses extracted from the electronic signal, and presenting the historical list of the Internet addresses to the user.

Preferably, the processor is further operable to receive a signal from the user indicating a selected Internet address from the historical list and provide a connection to a web page associated with the selected Internet address. In this way, the user does not have to view each and every web page associated with Internet addresses extracted from the electronic signal, and furthermore can view the web pages at a time and in an order of their choosing.

Preferably, the electronic signal can include a video signal, an audio signal, or a combined video and audio signal, such as a television program. The Internet addresses preferably include uniform resource locators (URLs), and the Internet addresses are preferably embedded in a vertical blanking interval of the electronic signal.

In further accordance with a preferred embodiment of the present invention, the receiver can include a set-top box or home gateway, and the processor can include a personal computer or web tablet. In addition, a first display is preferably provided in communication with the processor. In one embodiment, the processor can be provided in communication with the receiver, such that the electronic signal can also be displayed on the first display. In another embodiment, a second display, such as a television set, is provided in communication with the receiver for displaying the electronic signal to the user.

Still further, the at least one electronic signal can include a plurality of electronic signals. In this case, a tuner is provided in communication with the receiver for tuning to a selected one of the plurality of electronic signals. Advantageously, the historical list can include Internet addresses extracted from the plurality of electronic signals, such that Internet addresses from different programs are presented to the user in a seamless manner.

In a preferred embodiment, the historical list is configurable by the user. For example, the historical list can preferably include Internet addresses extracted over an amount of time selectable by the user, Internet addresses of a number selectable by the user, as well as program source information associated with each Internet address.

The above objects and other objects, features, and advantages of the present invention are more readily understood from a review of the attached drawings and the accompanying specification and claims.

BRIEF DESCRIPTION OF DRAWINGS

FIG. 4 is a schematic illustration of a screen display including the historical list of Internet addresses corresponding to the electronic signal.

BEST MODE FOR CARRYING OUT THE INVENTION

The system and method of the present invention integrate video and/or audio programming with the Internet. Specific Internet addresses are embedded in the program signal, such that users are able to receive content-related information in a more efficient manner than if programming or the Internet were used alone. Advantageously, the system and method of the present invention allow the retrieval of web sites related to the programming to be selectable by the user in the manner described below.

Figure 1:
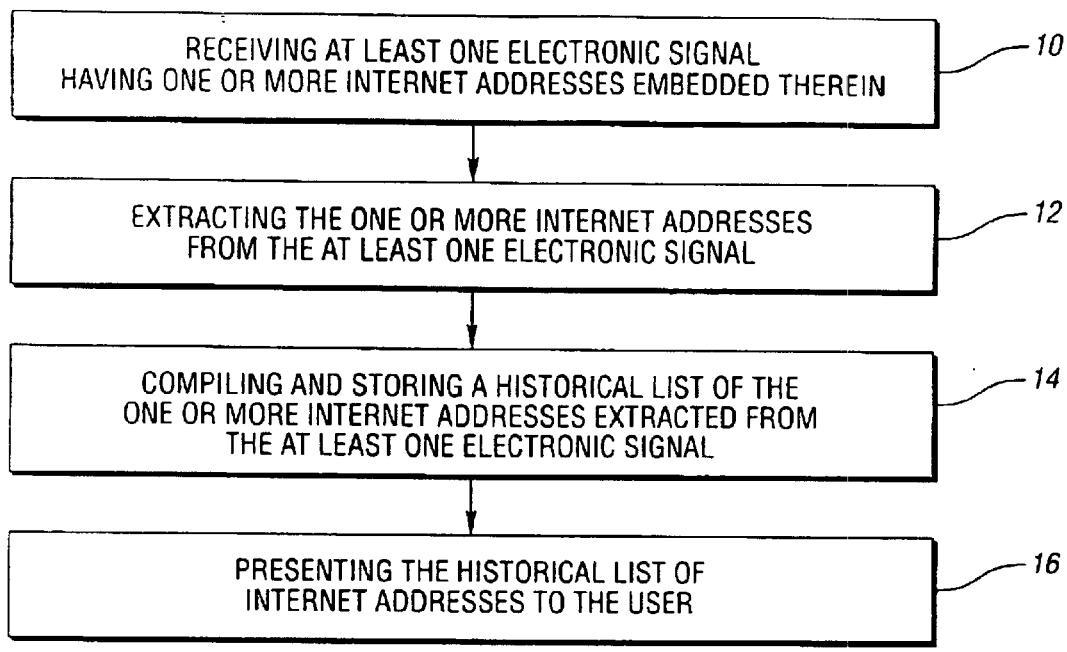
FIG. 1 is a flow diagram of a method in accordance with the present invention of providing Internet addresses corresponding to an electronic signal to a user.

Referring first to the flow diagram of FIG. 1, the method of the present invention is outlined. First, as shown at block 10, the method includes receiving at least one electronic signal, where the electronic signal includes one or more Internet addresses embedded therein. The method further includes extracting the one or more Internet addresses from the at least one electronic signal, as shown at block 12, and compiling and storing a historical list of the one or more Internet addresses extracted from the at least one electronic signal, as shown at block 14. Lastly, as shown at block 16, the method includes presenting the historical list of Internet addresses to the user.

Figure 2:
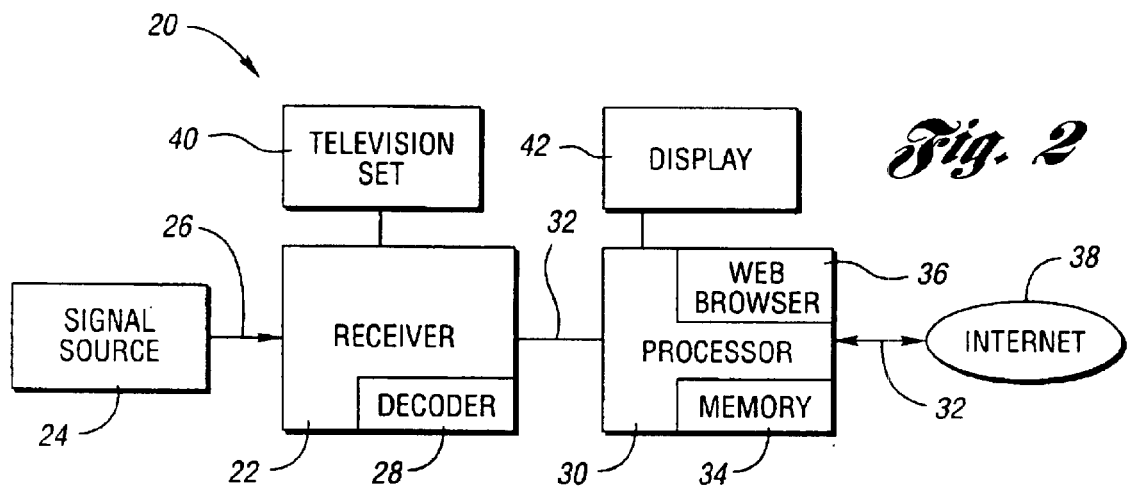
FIG. 2 is a block diagram of a system constructed in accordance with the present invention.

Turning now to FIG. 2, a system 20 is depicted for carrying out the method of the present invention. System 20 includes a receiver 22, preferably a set-top box or home gateway, that is constructed to receive at least one electronic signal from a signal source 24, such as a video server. Receiver 22 is connected to signal source 24 via a public or private network 26 which includes a telephone line, coaxial cable, fiber optic link, wireless, RF, satellite link, or the like. The electronic signal received from signal source 24 can represent a video signal, an audio signal, or a combined video/audio signal. For exemplary purposes, the electronic signal will be described herein as being a combined video/audio signal such as a television program. However, it is understood that any video and/or audio signal can be utilized in accordance with the system and method of the present invention. The electronic signal can be transmitted from signal source 24 to receiver 22 in analog, digital, or digitally compressed formats via such methods as a television broadcast, analog and digital cable, satellite, Internet, or analog and digital radio.

In an alternative embodiment of the present invention, the electronic signal can be provided to receiver 22 from a prerecorded storage medium such as an analog videotape, digital videodisc (DVD), personal video recorder disk, or digital music player. In this case, receiver 22 would be provided in communication with a VCR, DVD player, or other appropriate device (not shown).

In accordance with the system and method of the present invention, receiver 22 receives at least one television program signal having Internet addresses embedded therein by the broadcaster or content owner that correspond to the television program. As is known in the art, a plurality of program signals are typically received by receiver 22, and a user can select a specific program by utilizing a tuner (not shown) provided in communication with receiver 22. The Internet addresses embedded in the program signal are typically in the form of uniform resource locators (URLs), which are associated with particular web sites on the Internet as is also known in the art. The Internet addresses are preferably embedded in the vertical blanking interval (VBI) of the video signal by a URL encoder (not shown). Alternatively, the Internet addresses can be carried in the horizontal portion of the video signal, the close captioning of the video signal, an audio channel, a digital data field, or in any other part of the electronic signal in such a manner as not to interfere with the displayed video and/or audio.

Referring again to FIG. 2, receiver 22 is provided with a decoder 28 which is operable to extract the one or more Internet addresses which have been embedded in the television program signal selected by the user. Should a user decide to change the program, decoder 28 will continue extracting addresses from the new television program signal. Decoder 28 may be either a stand-alone unit, integrated within a set-top box, or implemented as a card provided in a personal computer or home gateway. The details of the construction of such a decoder are well known in the art and need not be described in further specificity herein.

System 20 further includes a processor 30 in communication with receiver 22 as shown in FIG. 2. Communication between receiver 22 and processor 30 is preferably accomplished via a home network 32, wherein the home network can include any of several signaling techniques such as radio frequency, power line, phone line, or coaxial cable. Processor 30 can be embodied in any device capable of establishing an Internet connection, including a personal computer, web tablet, Internet appliance, palm pilot, or cellular telephone. Processor 30 is operable to compile a historical list of the one or more Internet addresses extracted from the electronic signal. Advantageously, processor 30 utilizes Internet addresses extracted from each program selected by the user to compile the historical list. Processor 30 includes memory 34 for electronically storing the historical list, and platform independent software which is operable to present the historical list to the user. The software allows processor 30 to retrieve the web pages associated with the extracted Internet addresses at the selection of the user. In a preferred embodiment, a JAVA-enabled web browser 36 is utilized due to its platform independence. Processor 30 is operable to establish a connection to the Internet 38, typically via a modem (not shown) and home network 32. This connection can be initiated by the user or can be maintained continuously by processor 30, termed an "always on" Internet connection.

Still referring to FIG. 2, receiver 22 is in communication with at least one display such that a user can view the television program as well as the extracted Internet addresses. In a preferred embodiment, receiver 22 comprises a set-top box which is connected to a television set 40 and is also in communication with a display 42, such as a web tablet screen or computer monitor, via processor 30. In this embodiment, the set-top box is operable to receive a television program signal from signal source 24 and broadcast a display signal representing the television program to television set 40. Simultaneously, decoder 28 provided in communication with the set-top box extracts the Internet addresses embedded in the television program signal and provides the Internet addresses to processor 30 for display as a historical list via display 42.

Figure 3:
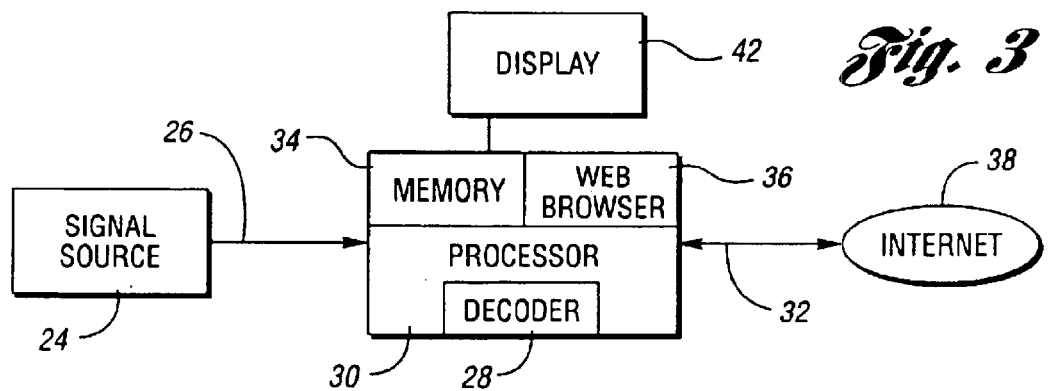
FIG. 3 is a block diagram of an alternative embodiment of the system of the present invention.

Alternatively, as depicted in FIG. 3, processor 30 can function as the receiver 22 provided that processor 30 is equipped with a television card (not shown). In this alternative embodiment, processor 30 includes the decoder 28 for extracting the one or more Internet addresses embedded in the television program signal. The television program is then displayed on a video window shown on display 42. On the same display screen, the extracted Internet addresses are displayed for the user.

In another alternative embodiment, the set-top box could be constructed to receive a digital television program signal. In this case, the Internet addresses are embedded into the digital program using MPEG or any other compression video scheme. The digital set-top box would again include a decoder 28 to extract the Internet addresses from the digital program. In accordance with still another alternative embodiment of the present invention, a digital television could function as the receiver 22, wherein the digital television would be operable to perform the functions of processor 30 and the digital set-top box.

Referring now to FIG. 4, a display screen 44 of web browser 36 is illustrated which depicts the presentation of the extracted Internet addresses 46 to the user in the form of a historical list 48. According to the system and method of the present invention, upon extraction the Internet addresses 46 are immediately displayed to the user via historical list 48 for easy viewing and selection. Therefore, the user does not have to remember the Internet addresses 46 from a text display or voice-over during the television program, or do any typing or text entry of the Internet address 46 in order to retrieve the associated web sites. Furthermore, historical list 48 can be maintained in memory 34 of processor 30 so that the user can access historical list 48 at a later time. In addition, historical list 48 can be printed by the user for continued reference. Users can then, at their leisure, direct web browser 36 to retrieve any of the associated web pages from the Internet 38. Advantageously, historical list 48 of the present invention gives users the capability to retrieve only the web pages of their choosing, regardless of when and in what order the pages were initially extracted and displayed.

In accordance with the present invention, web browser 36 is configured to have an Address List button 50 which a user can select to display historical list 48 and an Options button 52 which a user can select for displaying a configurations options window 54. For example, the user can select the duration that the Internet addresses 46 are displayed via historical list 48 in units of seconds, minutes, hours, or days. If a user has visited a web site associated with an Internet address 46, that Internet address 46 can be displayed with different visual characteristics, such as a change in text color or font. The user can also determine the length of historical list 48 by selecting a maximum number of Internet addresses 46 to be displayed therein. A scroll bar 56 is preferably provided to allow a user to scroll through historical list 48 and access those Internet addresses 46 which may not be shown on display screen 44. In addition, the user can have repeated Internet addresses 46 removed from historical list 48 if desired. As still an additional feature, historical list 48 can indicate the program name, channel, and/or time when a particular Internet address 46 was extracted so that users can put the Internet addresses 46 in context with the television program when going back to view the associated web sites at a later time. This feature is especially beneficial if the user was not present to view the total duration of the video/audio programming. Lastly, the user can selectively delete Internet addresses 46 in which he/she is not interested, and can move Internet addresses 46 of particular interest into a bookmark file on web browser 36.

Historical list 48 is updated to add an Internet address 46 each time a new Internet address 46 is received by processor 30. Advantageously, in accordance with the system and method of the present invention, decoder 28 will continue to extract Internet addresses 46 from the television program signal and communicate the Internet addresses 46 to processor 30 for display to the user regardless of whether or not the user chooses to access the associated web pages. The associated web pages are not immediately accessed by the system, so that the user maintains control of if, when, and in what order the web pages are retrieved for viewing. Therefore, the user does not have to view the web pages in any order or according to any time schedule, and does not have to make a decision to view or bypass one web page before moving on to a subsequent web page. In this way, the user does not have to view each and every web page designated by the video program, and furthermore can view the web pages at a time and in an order of their choosing.

Consequently, upon direction and command of the user, web browser 36 retrieves selected web pages from associated web sites identified by the Internet addresses 46 of historical list 48. The user may request access to the web site through a command to processor 30, such as through a keystroke, mouse, touch screen, or other input. Upon receiving such command, processor 30 establishes a communication link with the web site through transmission of a signal containing the selected Internet address 46. As described previously, the connection of processor 30 to the Internet 38 can be initiated by the user or can be maintained continuously by processor 30.

An example of the operation of system 20 is described below, again with reference to FIG. 4. Initially, suppose a user tunes receiver 22 to channel 4 which is broadcasting a baseball game between the Colorado Rockies and the San Diego Padres. Embedded in the television program signal are the Internet addresses for the Colorado Rockies, San Diego Padres, and Major League Baseball.

Therefore, processor 30 begins a historical list 48 displaying these Internet addresses 46. At a break in the baseball game, commercials are shown for Budweiser, Ford Trucks, eBay, MediaOne, and a cooperative advertisement for Weber grills and TrueValue hardware. Accordingly, Internet addresses 46 extracted during these commercials are also displayed on historical list 48 in the order in which the Internet addresses 46 were received. As the programming returns to the baseball game the Internet addresses 46 for the Colorado Rockies, San Diego Padres, and Major League Baseball are typically presented again to processor 30. In the example depicted in FIG. 4, the user has configured historical list 48 such that repeated Internet addresses 46 are not displayed.

As described above, historical list 48 can be compiled from video/audio programs shown on different broadcast channels, thereby capturing the user's television experience. For example, at the end of the baseball game, suppose the user tunes to ESPN which is broadcasting a hockey game between the Colorado Avalanche and the Detroit Red Wings. Accordingly, the Internet addresses for ESPN, the Colorado Avalanche, and the Detroit Red Wings are added to the same historical list 48 in a seamless manner. Over time, content-related Internet addresses 46 extracted from the television program signal will continue to be added to historical list 48. As described above, historical list 48 can be configured by the user to indicate program source information for the Internet addresses 46, and can also be limited by time and/or length.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A system for providing Internet addresses corresponding to an electronic signal to a user, the system comprising:
   a receiver for receiving a plurality of electronic signals each corresponding to a program, the plurality of electronic signals including one or more Internet addresses embedded therein;
   a decoder in communication with the receiver, the decoder for extracting the one or more Internet addresses from the plurality of electronic signals;
   a processor in communication with the decoder, the processor for automatically compiling a historical list of the Internet addresses extracted from the plurality of electronic signals over an amount of time selectable by the user without requiring selection of the Internet addresses by the user, wherein the processor includes memory for storing the historical list and program source information indicating the program from which each Internet address was extracted; and
   a web browser connected to the processor, the web browser for presenting the historical list of the Internet addresses and the associated program source information to the user.

2. The system of claim 1, wherein the processor is further operable to receive a signal from the user indicating a selected Internet address from the historical list and provide a connection to a web page associated with the selected Internet address.

3. The system of claim 1, wherein the receiver includes a set-top box.

4. The system of claim 1, wherein the receiver includes a home gateway.

5. The system of claim 1, wherein the processor includes a personal computer.

6. The system of claim 1, wherein the processor includes a web tablet.

7. The system of claim 1, further comprising a first display in communication with the processor.

8. The system of claim 7, wherein the processor is in communication with the receiver, and the plurality of electronic signals is displayed on the first display.

9. The system of claim 1, further comprising a second display in communication with the receiver for displaying the plurality of electronic signals to the user.

10. The system of claim 9, wherein the second display includes a television set.

11. The system of claim 1, further comprising a tuner in communication with the receiver for tuning to a selected one of the plurality of electronic signals.

12. The system of claim 1, wherein e historical list includes Internet addresses of a number selectable by the user.

13. The system of claim 1, wherein the plurality of electronic signals includes video signals.

14. The system of claim 1, wherein the plurality of electronic signals includes audio signals.

15. The system of claim 1, wherein the plurality of electronic signals includes combined video and audio signals.

16. The system of claim 1, wherein the Interpret addresses include uniform resource locators (URLs).

17. The system of claim 1, wherein the Internet addresses are embedded in a vertical blanking interval of the plurality of electronic signals.

18. A method for providing Internet addresses corresponding to an electronic signal to a user, the method comprising:
   receiving a plurality of electronic signals each corresponding to a program, wherein the plurality of electronic signals includes one or more Internet addresses embedded therein;
   extracting the Internet addresses from the plurality of electronic signals;
   automatically compiling and storing a historical list of the Internet addresses extracted from the plurality of electronic sign and program source information over an amount of the time selectable by the user without requiring selection of the Internet addresses by the user, the program source information indicating the program from which each Internet address was extracted; and
   presenting the historical list of the Internet addresses and the associated program source information to the user.

19. The method of claim 18, further comprising receiving a signal from the user indicating a selected Internet address from the historical list and providing a connection to a web page associated with the selected Internet address.

20. The method of claim 18, further comprising displaying the plurality of electronic signals to the user.

21. The method of claim 18, further comprising turning to a selected one of the plurality of electronic signals.

22. The method of claim 18, wherein presenting the historical list to the user includes presenting Intermit addresses of a number selectable by the user.

23. The method of claim 18, wherein receiving the plurality of electronic signals includes receiving video signals.

24. The method of claim 18, wherein receiving the plurality of electronic signals includes receiving audio signals.

25. The method of claim 18, wherein receiving the plurality of electronic signals includes receiving combined video and audio signals.

26. The method of claim 18, wherein extracting the Internet addresses includes extracting uniform resource locators (URLs).

27. The method of claim 18, wherein extracting the Internet addresses includes extracting the Internet addresses from a vertical blanking interval of the plurality of electronic signals.

* * * * *

UNITED STATES PATENT AND TRADEMARK OFFICE
CERTIFICATE OF CORRECTION

PATENT NO. : 6,862,611 B1
DATED : March 1, 2005
INVENTOR(S) : Monica A. Marics et al.

It is certified that error appears in the above-identified patent and that said Letters Patent is hereby corrected as shown below:

Column 8,
Line 6, delete "e" and insert therefor -- the --.

Signed and Sealed this

Twenty-fourth Day of May, 2005

JON W. DUDAS
*Director of the United States Patent and Trademark Office*